United States Patent
Washino

(10) Patent No.: US 8,339,661 B2
(45) Date of Patent: Dec. 25, 2012

(54) IMAGE PROCESSING APPARATUS AND IMAGE FORMING APPARATUS

(75) Inventor: Shigeki Washino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1285 days.

(21) Appl. No.: 11/508,988

(22) Filed: Aug. 24, 2006

(65) Prior Publication Data

US 2007/0171444 A1 Jul. 26, 2007

(30) Foreign Application Priority Data

Jan. 25, 2006 (JP) .................. 2006-016586

(51) Int. Cl.
*H04N 1/60* (2006.01)
*G03F 3/08* (2006.01)

(52) U.S. Cl. ......... 358/1.9; 358/504; 358/518; 358/521; 399/27; 399/321; 399/341

(58) Field of Classification Search ............ 358/1.9, 358/504, 518, 521; 399/1.9, 329, 341, 27, 399/321
See application file for complete search history.

(56) References Cited

U.S. PATENT DOCUMENTS

| | | | |
|---|---|---|---|
| 5,260,753 A | | 11/1993 | Haneda et al. |
| 6,681,095 B1 * | | 1/2004 | Tsuda ............... 399/341 |
| 7,206,097 B2 * | | 4/2007 | Takeda et al. ........... 358/1.9 |
| 7,324,240 B2 * | | 1/2008 | Ng ................. 358/1.9 |
| 7,358,994 B2 * | | 4/2008 | Yano ............. 348/254 |
| 2003/0161006 A1 * | | 8/2003 | Kobayashi et al. ........... 358/2.1 |
| 2005/0100239 A1 | | 5/2005 | Boon et al. |

(Continued)

FOREIGN PATENT DOCUMENTS

| | | |
|---|---|---|
| CN | 1607809 A | 4/2005 |
| CN | 1673879 A | 9/2005 |
| EP | 1 353 516 A1 | 10/2003 |
| JP | A-02-176777 | 7/1990 |
| JP | A-04-362960 | 12/1992 |
| JP | 2002-331708 | 11/2002 |
| JP | A-2006-099167 | 4/2006 |

OTHER PUBLICATIONS

Japanese Office Action with English translation, dated Jan. 17, 2008.

*Primary Examiner* — David K Moore
*Assistant Examiner* — Quang N Vo
(74) *Attorney, Agent, or Firm* — Morgan, Lewis & Bockius LLP

(57) ABSTRACT

An image processing apparatus that outputs color information to an image forming apparatus that forms a toner image on a sheet using color toner and transparent toner, the color information representing a toner image to be formed on the sheet by the image forming apparatus, including: an extracting unit that extracts a characteristic region from input image data; a first calculating unit that creates, based on the image data, first color information on a toner image corresponding to the color toner; a second calculating unit that calculates second color information by which a prescribed amount of the transparent toner is applied to the characteristic region extracted by the extracting unit; and an outputting unit that outputs the first and second color information calculated by the first and second calculating units to the image forming apparatus.

10 Claims, 5 Drawing Sheets

U.S. PATENT DOCUMENTS

| | | | |
|---|---|---|---|
| 2005/0135851 A1* | 6/2005 | Ng et al. | 399/341 |
| 2005/0175924 A1* | 8/2005 | Hasegawa et al. | 430/200 |
| 2005/0212930 A1* | 9/2005 | Sim et al. | 348/231.4 |
| 2005/0214669 A1 | 9/2005 | Hayashi et al. | |
| 2005/0219587 A1* | 10/2005 | Hayaishi | 358/1.9 |
| 2005/0281464 A1* | 12/2005 | Kaku | 382/173 |
| 2005/0286083 A1* | 12/2005 | Wang et al. | 358/3.06 |
| 2006/0051114 A1* | 3/2006 | Ng | 399/53 |
| 2006/0092446 A1* | 5/2006 | Bartosch et al. | 358/1.12 |
| 2006/0158555 A1* | 7/2006 | Seo et al. | 348/556 |
| 2006/0251299 A1* | 11/2006 | Kinjo | 382/118 |
| 2007/0242288 A1* | 10/2007 | Fan | 358/1.9 |

* cited by examiner

IMAGE PROCESSING APPARATUS AND IMAGE FORMING APPARATUS

BACKGROUND

1. Technical Field

The present invention relates to technology for improving the image quality of images formed by image forming apparatuses.

2. Related Art

Services for printing photographs taken with, for example, digital still cameras using photoelectric image forming apparatuses has become common. Photographs printed for such a use are often portrait photographs of people and landscape photographs of landscapes or buildings. In addition to ordinary color toners such as yellow (Y), magenta (M), cyan (C), and black (K), transparent toners without color are sometimes used in image forming apparatuses.

SUMMARY

According to an aspect of the invention, an image processing apparatus that outputs color information to an image forming apparatus that forms a toner image on a sheet using color toner and transparent toner, the color information representing a toner image to be formed on the sheet by the image forming apparatus is provided. The image processing apparatus includes: an extracting unit that extracts a characteristic region from input image data; a first calculating unit that creates, based on the image data, first color information on a toner image corresponding to the color toner; a second calculating unit that calculates second color information by which a prescribed amount of the transparent toner is applied to the characteristic region extracted by the extracting unit; and an outputting unit that outputs the first and second color information calculated by the first and second calculating units to the image forming apparatus.

BRIEF DESCRIPTION OF THE DRAWINGS

Exemplary embodiments of the present invention will be described in detail based on the following figures, wherein.

DETAILED DESCRIPTION

Exemplary embodiments of the present invention are described below with reference to the drawings. An electrophotographic printer (image forming apparatus) provided with an intermediate transferring belt and a so-called tandem engine is described in order to illustrate exemplary embodiments of the present invention, but this does not limit the present invention to these exemplary embodiments.

First Exemplary Embodiment

Figure 1:
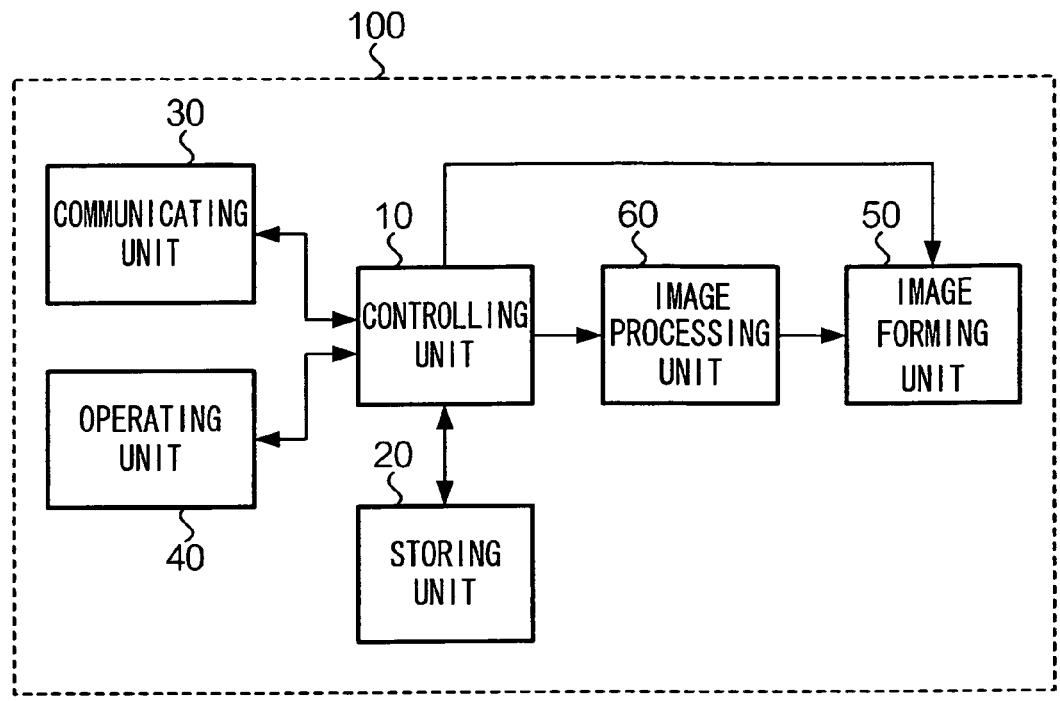
FIG. 1 is a block diagram showing an outline of an entire constitution of an image forming apparatus which is a first exemplary embodiment of the present invention.

FIG. 1 is a block diagram showing an outline of an entire constitution of an image forming apparatus 100 which is a first exemplary embodiment of the present invention. As shown in FIG. 1, the constitution of the image forming apparatus 100 is broadly divided into a controlling unit 10, a storing unit 20, a communicating unit 30, an operating unit 40, an image forming unit 50, and an image processing unit 60.

The controlling unit 10 is a computing device provided with a CPU (Central Processing Unit), a RAM (Random Access Memory), a ROM (Read Only Memory), and so on, and controls operations of the units of the image forming apparatus 100 by executing programs stored in the ROM. The storing unit 20 is a storage device such as a HDD (Hard Disk Drive) and stores various types of data used in image formation. The communicating unit 30 is an interface device for transmitting and receiving image data to and from external apparatuses such as a digital still camera, a personal computer, and a scanner. Note that the image data acquired via the communicating unit 30 in the present embodiment is assumed to be image data made up of three color components: red (R), green (G), and blue (B). This image data will hereafter be referred to as "RGB-format image data." The operating unit 40 is an input device provided with a touch panel, and displays a variety of information related to image formation as well as receiving instructions from users.

The image forming unit 50 forms images based on image data input via the communicating unit 30 onto recording material in the form of a sheet (hereafter, "recording paper"). This recording paper includes so-called ordinary paper, paper whose surface has been coated with, for example, resin, and recording materials of material other than paper. The image forming unit 50 is provided with the following constitution specifically.

Figure 2:
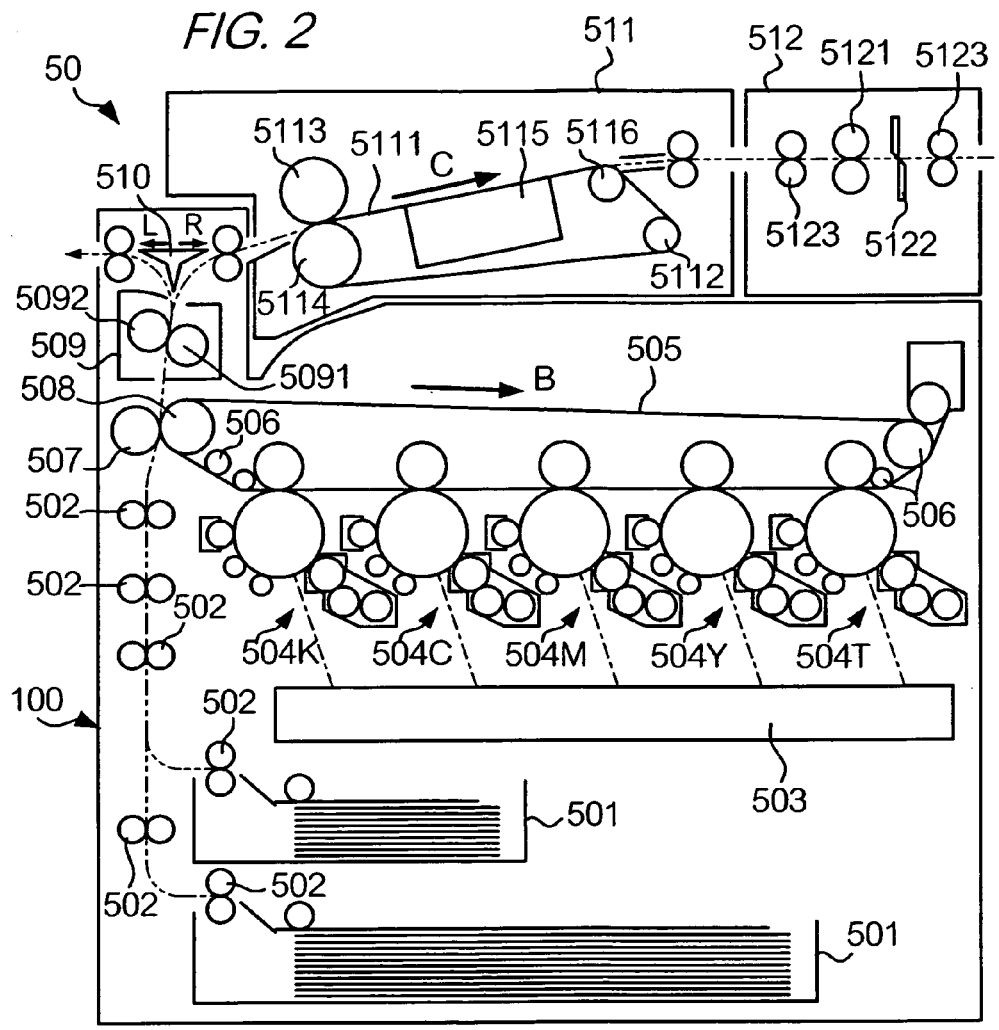
FIG. 2 is a view showing in detail a constitution of an image forming unit of the image forming apparatus.

FIG. 2 is a view showing in detail a constitution of the image forming unit 50. In FIG. 2, the two-dash broken line shows a transportation path of the recording paper. The image forming unit 50 is provided with multiple paper feed trays 501, multiple paper transportation rolls 502, an exposing device 503, image transferring units 504T, 504Y, 504M, 504C, and 504K, an intermediate transferring belt 505, multiple belt supporting rolls 506, a second image transferring roll 507, a backup roll 508, a first fixing device 509, a transportation path switching mechanism 510, a second fixing device 511, and a cutting apparatus 512.

The paper feed trays 501 hold recording paper of prescribed types and sizes and feed the recording paper at a timing instructed by the controlling unit 10. The paper transportation rolls 502 transport the recording paper fed by the paper feed trays 501 to a nip region formed by the second image transferring roll 507 and the backup roll 508. The exposing device 503 is provided with a laser light emitting source, a polygon mirror, and so on, and shines laser light on the image transferring units 504T, 504Y, 504M, 504C, and 504K in accordance with the image data.

The image transferring units 504T, 504Y, 504M, 504C, and 504K form toner images using transparent (T) toner and yellow (Y), magenta (M), cyan (C), and black (K) color toners, and transfer them to the intermediate transferring belt 505. Transparent toner is toner which contains no color materials, and in which $SiO_2$ (silicon dioxide) or $TiO_2$ (titanium dioxide) has been added to a low-molecular-weight polyester resin, for example. Toner images formed with transparent toner are transparent on the recording paper.

Note that the image transferring units 504T, 504Y, 504M, 504C, and 504K only differ in the toner each uses, and that otherwise there are no major differences in their constitutions. Accordingly, when there is no particular need to distinguish among them, the letters after the numeric designation indicating the color of the toner shall be omitted, and they shall be referred to as "the image transferring unit 504."

Figure 3:
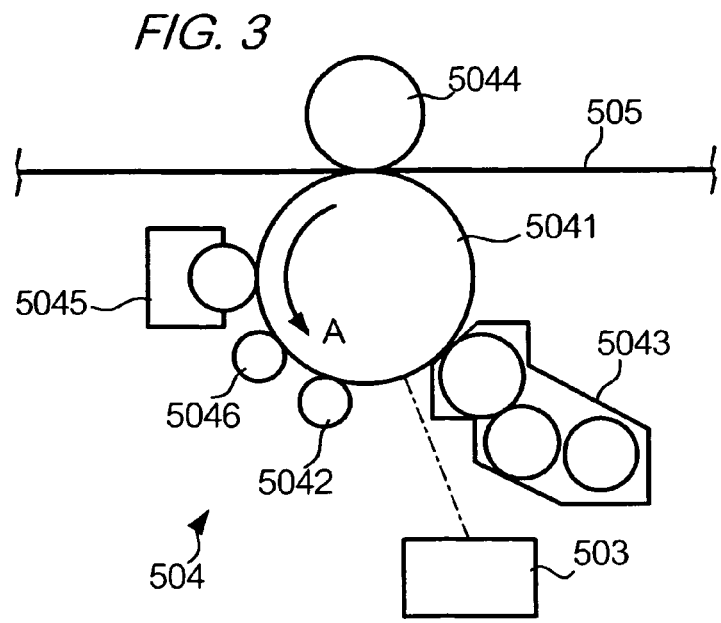
FIG. 3 is a view showing in detail a constitution an image transferring unit of the image forming unit.

Here, FIG. 3 is a view showing in detail a constitution of the image transferring unit 504. As shown in FIG. 3, the image transferring unit 504 is provided with a photosensitive drum 5041, a roller charger device 5042, a developing device 5043, a first image transferring roll 5044, a drum cleaner 5045, and a static eliminator 5046. The photosensitive drum 5041 is an image holding body having a charge generating layer and a charge transporting layer, and is rotated by an unillustrated driving unit in the direction of the arrow A in the figure. The roller charger device 5042 uniformly charges the surface of the photosensitive drum 5041. An electrostatic latent image is written to the surface of the charged photosensitive drum 5041 by the exposing device 503. The developing device 5043 contains toner of one of the colors T, Y, M, C, or K, and creates a prescribed potential difference (developing bias) between itself and the surface of the photosensitive drum 5041. The toner sticks to the electrostatic latent image formed on the surface of the photosensitive drum 5041 due to the potential difference, and a toner image is formed on the surface of the photosensitive drum 5041. The first image transferring roll 5044 creates a prescribed potential difference (image transferring bias) at a position at which the intermediate transferring belt 505 opposes the photosensitive drum 5041, and the toner image is transferred to the intermediate transferring belt 505 due to the potential difference. The drum cleaner 5045 eliminates any untransferred toner remaining on the photosensitive drum 5041 after transfer of the toner image. The static eliminator 5046 discharges the surface of the photosensitive drum 5041. In other words, the drum cleaner 5045 and the static eliminator 5046 eliminate any unneeded toner and charge from the photosensitive drum 5041 in preparation for formation of the next toner image.

Here we return to the description of the constitution shown in FIG. 2. The intermediate transferring belt 505 is an endless belt member, and the belt supporting rolls 506 stretch and hold the intermediate transferring belt 505. At least one of the belt supporting rolls 506 has a driving unit and moves the intermediate transferring belt 505 in the direction of arrow B in the figure. Note that the belt supporting rolls 506 which do not have driving units are rotated by the movement of the intermediate transferring belt 505. The rotation of the intermediate transferring belt 505 moving in the direction of arrow B in the figure moves the toner image transferred by the image transferring unit 504 to the nip region formed by the second image transferring roll 507 and the backup roll 508.

The second image transferring roll 507 and the backup roll 508 create a prescribed potential different (second image transfer bias) at a position at which the intermediate transferring belt 505 opposes the recording paper, and the toner image is transferred to the recording paper by the potential difference. The first fixing device 509 is provided with a heating roll 5091 and a pressure roll 5092, and fixes the toner image transferred onto the recording paper by heating and pressing the recording paper using these roll members.

The transportation path switching mechanism 510 has a function of selecting the transportation direction of the recording paper. The transportation path switching mechanism 510 transports the recording paper in the direction of either arrow L or R in the figure depending on the type of recording paper and the image formed on the recording paper. For example, the transportation path switching mechanism 510 transports recording paper which does not need the fixing process by the second fixing device 511 or on which no toner image using transparent toner is formed in the direction of arrow L in the figure, and transports other recording paper in the direction of arrow R in the figure.

The second fixing device 511 is provided with a fixing belt 5111, a driving roll 5112, a pressure roll 5113, a heating roll 5114, a heat sink 5115, and a release roll 5116. The fixing belt 5111 is an endless belt member with a flat surface. The driving roll 5112 is rotated by an unillustrated driving unit, and rotationally moves the fixing belt 5111 in the direction of arrow C in the figure. The pressure roll 5113 sandwiches the recording paper between itself and the fixing belt 5111, thereby pressing it. The heating roll 5114 is a roll member provided with an internal heat source, and applies heat to the recording paper via the fixing belt 5111. The heat sink 5115 is a cooling device provided in intimate contact with the fixing belt 5111, and cools the recording paper heated by the heating roll 5114. The release roll 5116 is wound and stretched across the fixing belt 5111, and releases the recording paper from the fixing belt 5111 using the rigidity of the recording paper itself.

With this constitution, the second fixing device 511 once again heats and presses the recording paper onto which the toner image has been fixed by the first fixing device 509, thereby reduces the unevenness and bumps of the toner image on the surface of the recording paper by bringing the recording paper into intimate contact with the fixing belt 5111, cools the recording paper while maintaining it in this state, and then ejects it. As a result, the second fixing device 511 can improve the flatness and glossiness of the recording paper.

The cutting apparatus 512 is provided with a slitter 5121, a recipro-cutter 5122, and multiple transportation rolls 5123. The slitter 5121 is a disc-shaped cutter that cuts both edges of the recording paper along the transportation direction, and the recipro-cutting 5122 is a cutter that cuts the recording paper in a direction perpendicular to the transportation direction. The transportation rolls 5123 move the recording paper in the transportation direction. Note also that the slitter 5121 and the recipro-cutter 5122 are adjusted in position so as to cut the recording paper at a prescribed position. With this constitution, the cutting unit 512 cuts the recording paper on four sides, and can thereby make image formed on the recording paper borderless images.

The constitution of the image forming unit 50 is as above. Next, the image processing unit 60 is described. The image processing unit 60 is provided with an ASIC (Application-Specific Integrated Circuit) and memory in order to execute prescribed image processes, and generates image data capable of being processed by the image forming unit 50 based on the image data acquired via the communicating unit 30. Image data capable of being processed by the image forming unit 50 refers to a set of color information representing the T, Y, M, C, and K color toner images. Note that the image processing unit 60 has a function of extracting a human face region (hereafter, "characteristic region") from the image data based on a prescribed algorithm.

With the constitution described above, the image forming apparatus 100 of the present embodiment generates five types of color information (T, Y, M, C, and K) from the image data input from an external device, and forms toner images on the recording paper according to this color information. The image forming apparatus 100 classifies the image data into a characteristic region and other regions, and applies differing amounts of transparent toner to each region. A process for the image processing unit 60 in order to realize this is described below.

Figure 4:
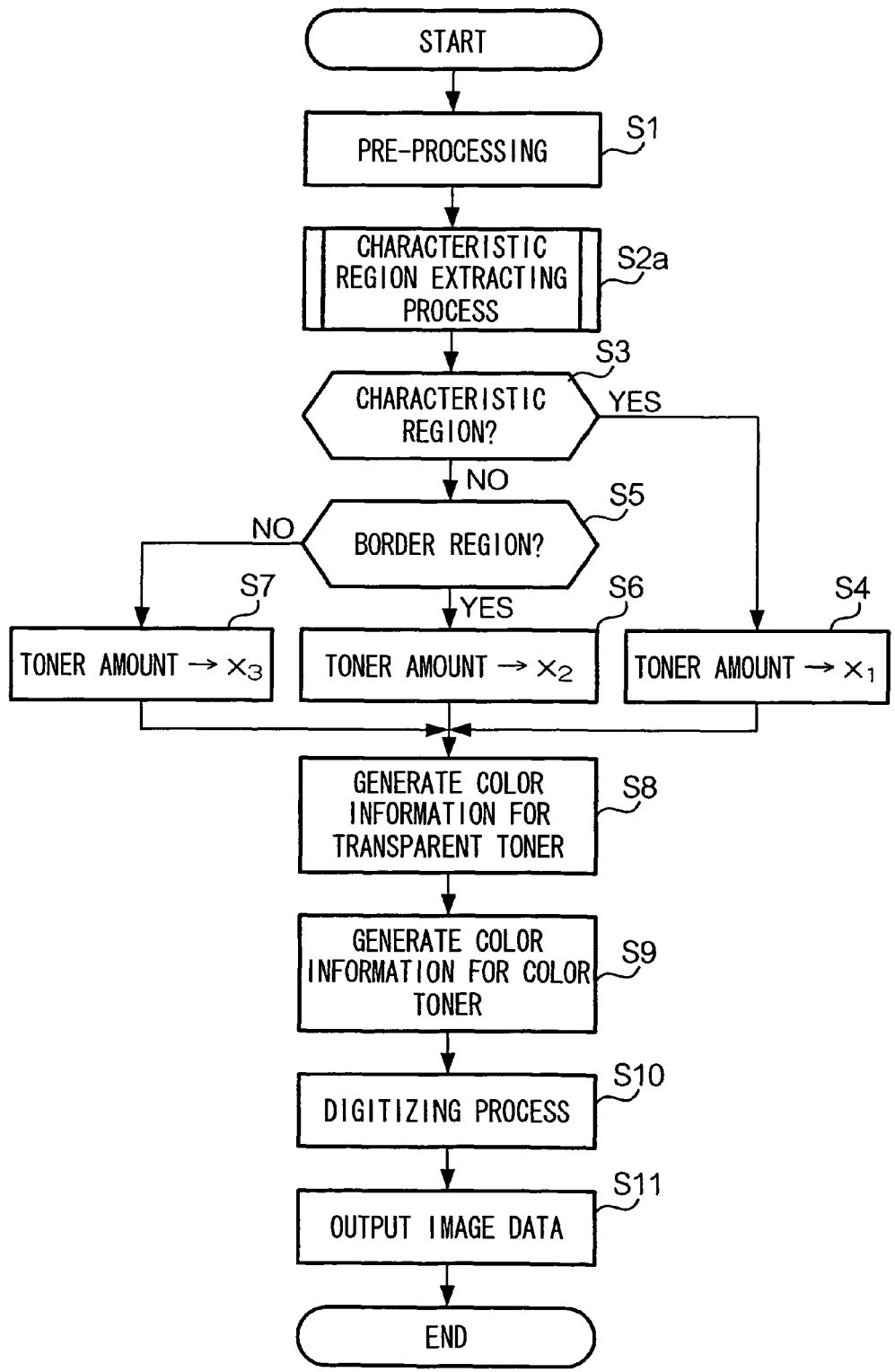
FIG. 4 is a flow chart showing a process executed in an image processing unit of the image forming apparatus.

FIG. 4 is a flow chart showing a process executed in the image processing unit 60 of the image forming apparatus 100. This process is executed when the image data acquired via the communicating unit 30 is input to the image processing unit 60 by the controlling unit 10. Following the figure, first the image processing unit 60 executes a prescribed pre-process on the input image data (step S1). This pre-process includes, for example, a smoothing process in order to eliminate noise contained in the image data. If the image data has been photographed using a digital still camera, then white balance correction may be performed. If the image data has been read by a scanner, then shading correction may be performed.

Figure 5:
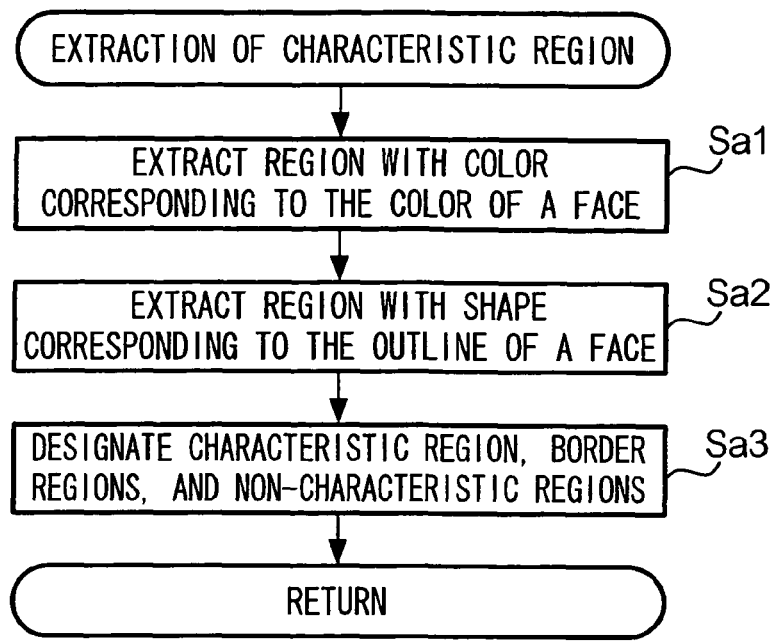
FIG. 5 is a flow chart showing a characteristic region extracting process executed in the image processing unit.

Next the image processing unit 60 performs a process for extracting the characteristic region (step S2*a*). FIG. 5 is a flow chart showing this process in detail. As shown in FIG. 5, first the image processing unit 60 extracts a region which is a color corresponding to the color of a human face from the image data (step Sa1). The color corresponding to the color of a human face is decided ahead of time and stored in the storing unit 20. Next the image processing unit 60 determines the shapes of the regions extracted in step Sa1, and extracts regions which have shapes corresponding to the outline shape of a human face from these regions (step Sa2). This process eliminates, from the characteristic region, regions which have a color corresponding to the color of a human face if the shape of the regions is clearly different from the outline shape of a human face. The shape corresponding to the outline shape of a human face is, for example, an approximately round shape, and is stored in the storing unit 20.

Next the image processing unit 60 designates the regions extracted in step Sa2 in the input image data as "characteristic regions," and other regions as regions which are not characteristic regions, or "non-characteristic regions" (step Sa3). The image processing unit 60 designates regions which are non-characteristic regions and which form a border with a characteristic region as "border regions." These border regions are regions which have a width of a prescribed number of pixels, and exist so as to create an outline of the characteristic regions. The extracting process for the characteristic regions is as described above.

Next the image processing unit 60 uses the extraction results from step Sa2 to calculate the amount of transparent toner to apply to each region. Specifically, the image processing unit 60 judges whether or not each pixel in the image data is in a characteristic region (step S3), and sets the amount of toner for pixels belonging to characteristic regions as $x_1$ (step S4). On the other hand, the image processing unit 60 judges whether or not pixels which do not belong to characteristic regions are in border regions (step S5), and sets the amount of toner for pixels which belong to border regions as $x_2$ and the amount of toner for pixels which belong to non-characteristic regions as $x_3$ (steps S6 and S7). Note that the values of $x_1$, $x_2$, and $x_3$ are arbitrary values which satisfy the relationship $x_1 > x_2 > x_3$, with $x_1$ desirably being around two times (or more) larger than $x_3$. After calculating the amount of transparent toner for each pixel in the pixel data in this way, the image processing unit 60 generates color information representing these toner amounts (step S8).

Next the image processing unit 60 performs a color conversion process on the input image data and generates color information representing toner amounts for the color toners (step S9). The color conversion process applies, for example, a look-up table to the RGB-format image data, calculates the color components for the three colors cyan (C), magenta (M), and yellow (Y), and then calculates the black (K) color component by performing the commonly known under-color removal (UCR) process. In other words, by performing the color conversion process, it is possible to convert the RGB-format image data into image data made up of four color components C, M, Y and K (hereafter, "CMYK-format image data"). The color components of CMYK-format image data express the amounts of toner corresponding to each color.

Note that multiple look-up tables used in the color conversion process are stored ahead of time in the storing unit 20 or in the memory. The image processing unit 60 applies different look-up tables corresponding respectively to the characteristic regions, the non-characteristic regions, and the border regions. Alternatively, the image processing unit 60 may apply one of the look-up tables corresponding respectively to the characteristic regions and the non-characteristic regions in an alternating or random fashion for pixels to be processed in the border regions. The reason that the look-up tables are made to differ for the characteristic regions and the non-characteristic regions is that the color tone of the image slightly changes according to the amount of transparent toner.

After the color information for the color toners and the transparent toner is generated in this way, the image processing unit 60 performs halftoning on the various color information and binarizes the color information (step S10). The halftoning is performed by applying screens according to the output resolution of the image forming unit 50. Thereafter, the image processing unit 60 outputs to the image forming unit 50 a set of color information for the colors T, Y, M, C, and K, or in other words, image data capable of being processed by the image forming unit 50 (step S11).

Second Exemplary Embodiment

Next, a second exemplary embodiment of the present invention is described. The image forming apparatus of the present embodiment has a constitution which is approximately the same as that of the image forming apparatus 100 of the first exemplary embodiment. Accordingly, descriptions of sections which are the same as in the first exemplary embodiment are omitted, and the description focuses on sections which are characteristic of the present embodiment.

Figure 6:
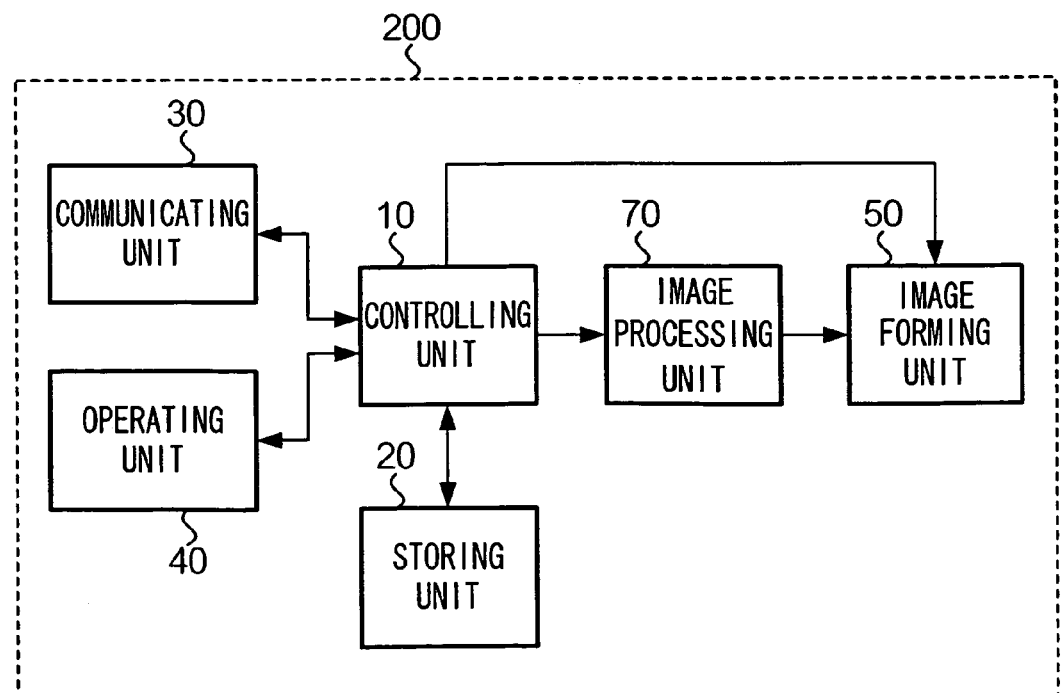
FIG. 6 is a block diagram showing an outline of an entire constitution of an image forming apparatus which is a second exemplary embodiment of the present invention.

FIG. 6 is a block diagram showing an outline of a constitution of an image forming apparatus 200 of the present embodiment. As shown in FIG. 6, the constitution of the image forming apparatus 200 is broadly divided into a controlling unit 10, a storing unit 20, a communicating unit 30, an operating unit 40, an image forming unit 50, and an image processing unit 70, and is the same as the constitution of the first exemplary embodiment except for the image processing unit 70. The image processing unit 70 is the same as the image processing unit 60 described above in that it is constituted by an ASIC and a memory, but the details of the image processing which it can execute is partially different.

Figure 7:
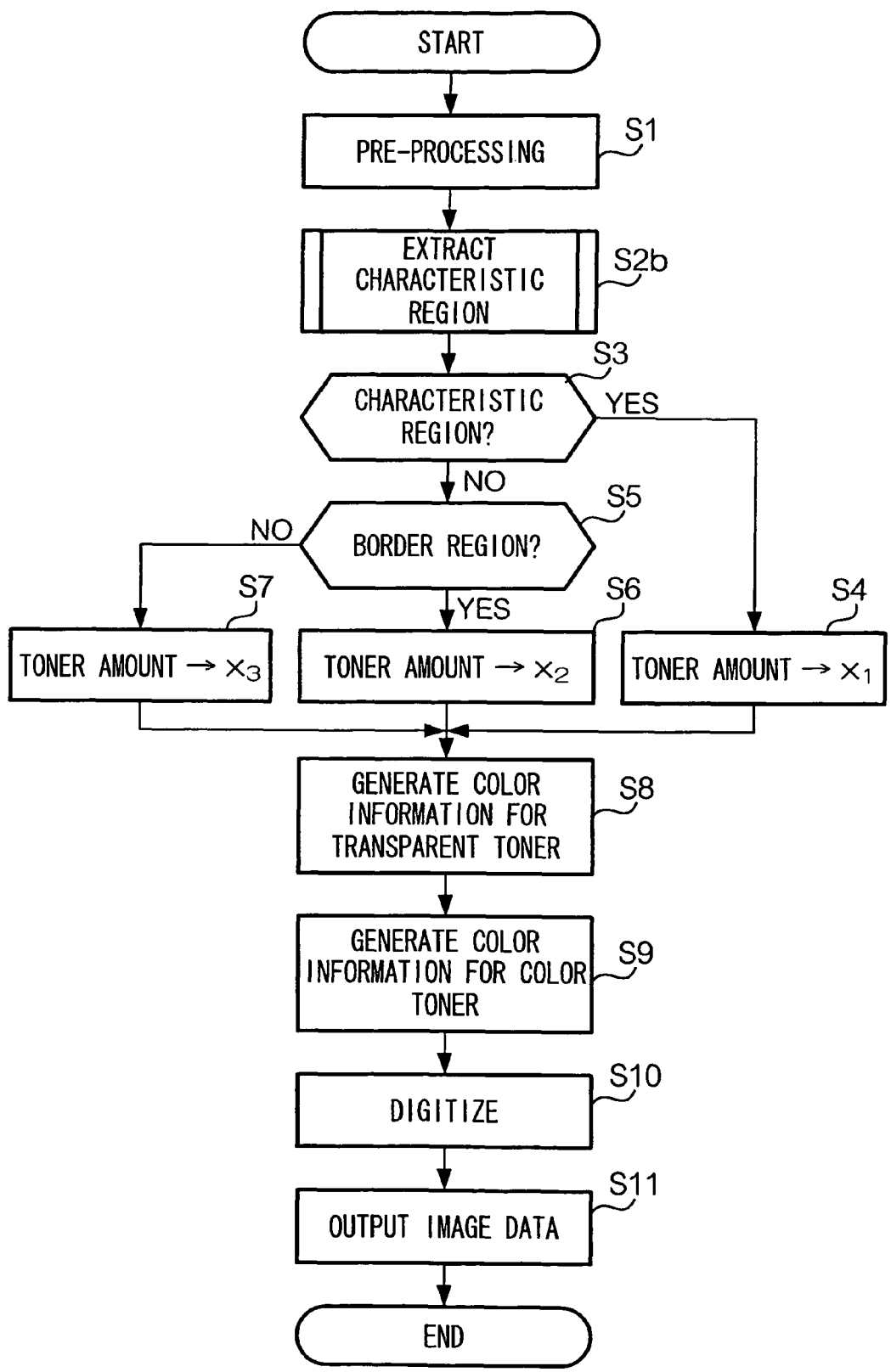
FIG. 7 is a flow chart showing a process executed in the image processing unit of the image forming apparatus.

FIG. 7 is a flow chart showing a process executed in the image processing unit 70 of the image forming apparatus 200. Note that in FIG. 7, steps which perform the same processes as the image process (see FIG. 4) in the first exemplary embodiment have the same numerical designation. In other words, as shown in FIG. 7, the image processing in the present embodiment differs from the image processing in the first exemplary embodiment only in the extracting process of the characteristic regions (step S2*b*).

Figure 8:
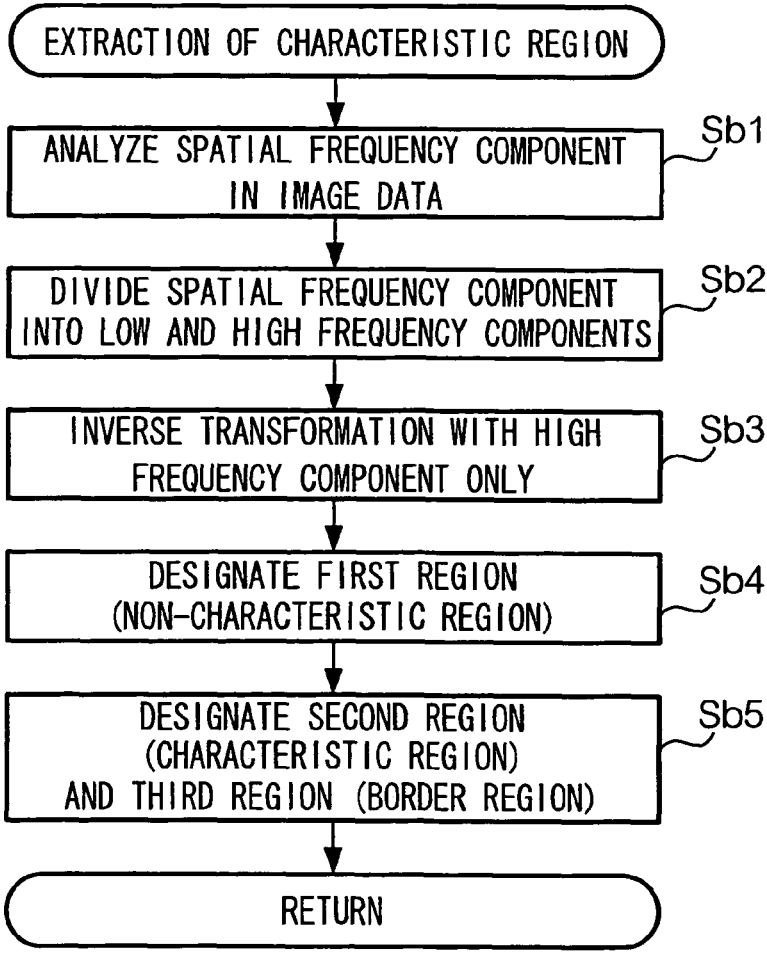
FIG. 8 is a flow chart showing the characteristic region extracting process executed in the image processing unit.

FIG. 8 is a flow chart showing the extracting process of the characteristic region in the present embodiment. Following this figure, first the image processing unit 70 applies a spatial frequency filter to the input data and analyzes the spatial frequency component of the image data (step Sb1). Note that the type of spatial frequency filter is not particularly limited, and that filters can be used which use wavelet transformation or Fourier transformation (fast Fourier transformation), for example.

Next the image processing unit 70 divides the spatial frequency component analyzed in step Sb1 into a low frequency component and a high frequency component, divided by a prescribed spatial frequency (step Sb2). After designating a high frequency component in this way, the image processing unit 70 performs a transformation process for restoring the image data using the high frequency component (step Sb3). The transformation process performed at this time is equivalent to an inverse transformation of the transformation performed in step Sb1. The image data which is made up only of the high frequency component clearly expresses the edges included the input data, or the original image data. In other words, regions which contain many of these edges are regions in which the gradation changes of the image are very sharp. Accordingly, the image processing unit 70 designates the regions in the original image data which contain many edges based on the image data generated (restored) in step Sb3 (step Sb4). The regions designated at this time are hereafter called a "first region."

Next, the image processing unit 70 designates regions in the original image data different from the first region above as a "second region," and then designates regions belong to borders between the first region and the second region as a "third region" (step Sb5). In other words, in the image data, the first region is a region which includes relatively many high frequency components of the spatial frequency components and the second region is a region which includes relatively many low frequency components of the spatial frequency components. The first region, second region, and third region designated in this way are treated hereafter as corresponding to the non-characteristic regions, the characteristic regions, and the border regions described above. That is how the extracting process of the characteristic region is performed.

The second region designated through the process described above is a region with few edges and gentle gradation changes. In general, gradations change smoothly in images in these regions, making the graininess more readily visible. Accordingly, the image forming apparatus 200 of the present embodiment applies a greater amount of the transparent toner to such regions, rendering the graininess of the image less readily visible.

Modifications

Two exemplary embodiments have been given to describe embodiments of the present invention, but the present invention is not limited to these embodiments, and may be embodied in many other aspects. In the present invention, it is possible to apply the following modifications, for example, to the embodiments described above. Note that these modifications can be combined as appropriate.

The above embodiments are examples in which the present invention is applied to an image forming apparatus provided with a so-called tandem engine, but the present invention may be applied to rotary developing image forming apparatuses. A constitution including a paper transportation belt in lieu of the intermediate transferring belt, or in other words, a constitution in which a toner image is directly transferred from a photosensitive drum to recording paper without using an intermediate transferring belt, is also possible. In either case, it is desirable for the toner image using color toner to be transferred in an order such that it is positioned closer to the recording paper than the toner image using transparent toner, or in other words, an order in which the toner image using color toner is covered by the toner image using transparent toner. This is because with this kind of constitution, most of the toner remaining on the photosensitive drum or the intermediate transferring belt is the transparent toner, and therefore the transferring efficiency of the color toner is greater, and a deterioration in the color tone and graininess can be suppressed.

In the exemplary embodiments described above, the image processing unit performs a process to convert RGB-format image data directly into CMYK-format image data, but a constitution is also possible in which RGB-format image data is provisionally converted into data expressed in a uniform color space (e.g., image data expressed in the CIELAB color system), and then converted into CMYK-format image data.

Furthermore, in the above embodiments, less transparent toner is applied to the non-characteristic regions than to the characteristic regions, but a constitution is also possible in which no transparent toner is applied to the non-characteristic regions. This is because in non-characteristic regions a high-level graininess is not demanded. Furthermore, in the above exemplary embodiments, border regions are provided between the characteristic regions and the non-characteristic regions, but the process of designating the border regions can be omitted.

It is also possible to perform different image processes for each region, using the fact that characteristic regions and non-characteristic regions are designated in the image data. For example, a smoothing process or a noise eliminating process may be performed in order to smooth regions designated as characteristic regions (human face regions in particular). It is also possible to perform a process of emphasizing sharpness in order to make the facial features stand out more after performing the smoothing process or the noise elimination process in the regions designated as face regions, in particular.

Note that the possibility of characteristic regions being mistakenly identified cannot be denied depending on the constitution of the above embodiments. For example, it is possible that a human face is not identified as a characteristic region (because, for example, it is partially hidden by something), or, conversely, that a region which does not require processing as a characteristic region is identified as a characteristic region. Accordingly, a constitution is possible in which, for example, whether or not to extract characteristic regions can be selected by a user via the operating unit, or a constitution in which the regions in the image data to undergo processing as characteristic regions can be specified.

Furthermore, in the first exemplary embodiment described above, the region extracted as the characteristic region is a region corresponding to a human face, but various other regions in which graininess is readily visible may be extracted, and not just that region. A representative example of such regions is a sky region included in, for example, a landscape or similar photograph. In order to designate a sky region, a judgment can be made based on the color (blue or light blue) and/or position (upper portion of the image), for example.

Note that in the embodiments described above, the image processing unit is constituted by an ASIC and so on, but the image processing unit may be constituted by a program capable of being executed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus that outputs color information to an image forming apparatus that forms a toner image on a sheet using color toner and transparent toner, the color information representing a toner image to be formed on the sheet by the image forming apparatus, comprising:
    an extracting unit that extracts a characteristic region of a predetermined color and shape, a non-characteristic region that is other than the characteristic region, and a border region that forms a border between the characteristic region and the non-characteristic region, from input image data;
    a first calculating unit that creates, based on the image data, first color information on a toner image corresponding to the color toner;
    a second calculating unit that calculates second color information representing a first amount of transparent toner to be applied to the extracted characteristic region, a second amount of transparent toner smaller than the first amount to be applied to the extracted border region, and a third amount of transparent toner smaller than the second amount to be applied to the extracted non-characteristic region.

2. The image processing apparatus according to claim 1, wherein the extracting unit extracts a region corresponding to a human face or a sky from input image data as the characteristic region.

3. The image processing apparatus according to claim 1, wherein the extracting unit comprises an analyzing unit that analyzes a frequency component of input image data, and extracts a region containing areas in which the frequency component analyzed by the analyzing unit is a low frequency component as the characteristic region.

4. An image forming apparatus comprising:
    an extracting unit that extracts a characteristic region of a predetermined color and shape, a non-characteristic region that is other than the characteristic region, and a border region that forms a border between the characteristic region and the non-characteristic region, from input image data;
    a first calculating unit that creates, based on the image data, first color information on a toner image corresponding to color toner;
    a second calculating unit that calculates second color information representing a first amount of transparent toner to be applied to the extracted characteristic region, a second amount of transparent toner smaller than the first amount to be applied to the extracted border region, and a third amount of transparent toner smaller than the second amount to be applied to the extracted non-characteristic region.

5. The image forming apparatus according to claim 4, further comprising a fixing unit that fixes the toner images on the sheet by applying heat and pressure,
    wherein the fixing unit comprises a first fixing part and a second fixing part, the second fixing part including a cooling part that cools the sheet and the toner images fixed thereon.

6. The image processing apparatus according to claim 1, wherein the first amount is at least two times the third amount.

7. The image forming apparatus according to claim 4, wherein the first amount is at least two times the third amount.

8. An image processing apparatus that outputs color information to an image forming apparatus that forms a toner image on a sheet using color toner and transparent toner, the color information representing a toner image to be formed on the sheet by the image forming apparatus, comprising:
    an extracting unit that includes an analyzing unit that analyzes a frequency component of input image data, divides the frequency component analyzed by the analyzing unit into a low frequency component and a high-frequency component by a prescribed special frequency, restores an image data using the high-frequency component, and extracts a characteristic region that contains a number of edges, which is greater than a threshold, from the input image data based on the restored image data, a non-characteristic region that is other than the characteristic region, and a border region that forms a border between the characteristic region and the non-characteristic region;
    a first calculating unit that creates, based on the image data, first color information on a toner image corresponding to the color toner; and
    a second calculating unit that calculates second color information representing a first amount of transparent toner to be applied to the extracted characteristic region, a second amount of transparent toner smaller than the first amount to be applied to the extracted border region, and a third amount of transparent toner smaller than the second amount to be applied to the extracted non-characteristic region.

9. An image forming apparatus comprising:
    an extracting unit that includes an analyzing unit that analyzes a frequency component of input image data, divides the frequency component analyzed by the analyzing unit into a low frequency component and a high-frequency component by a prescribed special frequency, restores an image data using the high-frequency component, and extracts a characteristic region that contains a number of edges, which is greater than a threshold, from the input image data based on the restored image data, a non-characteristic region that is other than the characteristic region, and a border region that forms a border between the characteristic region and the non-characteristic region;
    a first calculating unit that creates, based on the image data, first color information on a toner image corresponding to color toner;
    a second calculating unit that calculates second color information representing a first amount of transparent toner to be applied to the extracted characteristic region, a second amount of transparent toner smaller than the first amount to be applied to the extracted border region, and a third amount of transparent toner smaller than the second amount to be applied to the extracted non-characteristic region.

10. The image forming apparatus according to claim 8, wherein the extracting unit comprises an analyzing unit that analyzes a frequency component of input image data, and extracts a region containing areas in which the frequency component analyzed by the analyzing unit is a low frequency component as the characteristic region.

* * * * *